United States Patent
Lan et al.

(10) Patent No.: US 7,920,877 B2
(45) Date of Patent: Apr. 5, 2011

(54) USING BASE-STATION LOCATION TO ASSIST MOBILE-DEVICE SYSTEM ACQUISITION

(75) Inventors: Wei-Ming Lan, Morrisville, NC (US); Abhinay Talaulicar, Herndon, VA (US)

(73) Assignee: Clear Wireless LLC, Kirkland, WA (US)

( * ) Notice: Subject to any disclaimer, the term of this patent is extended or adjusted under 35 U.S.C. 154(b) by 511 days.

(21) Appl. No.: 12/147,901

(22) Filed: Jun. 27, 2008

(65) Prior Publication Data

US 2009/0325594 A1 Dec. 31, 2009

(51) Int. Cl.
*H04W 24/00* (2009.01)

(52) U.S. Cl. .......... 455/456.1; 455/404.2; 455/414.1; 455/418; 455/450; 455/464

(58) Field of Classification Search .......... 455/456.1, 455/404.2, 414.1, 418, 450, 464
See application file for complete search history.

(56) References Cited

U.S. PATENT DOCUMENTS

| | | | |
|---|---|---|---|
| 6,234,705 B1 | 5/2001 | Troxell | |
| 6,343,070 B1 | 1/2002 | Klas et al. | |
| 6,714,789 B1 | 3/2004 | Oh et al. | |
| 7,092,722 B1 | 8/2006 | Oh et al. | |
| 7,164,920 B2 | 1/2007 | Giacalone et al. | |
| 7,260,394 B2 | 8/2007 | Welnick et al. | |
| 7,305,232 B2 | 12/2007 | Ono et al. | |
| 2003/0134637 A1 | 7/2003 | Cooper | |
| 2006/0073836 A1* | 4/2006 | Laroia et al. | 455/450 |

FOREIGN PATENT DOCUMENTS

| | | |
|---|---|---|
| EP | 1 276 342 | 1/2003 |
| WO | WO 97/36443 | 10/1997 |
| WO | WO 02/076117 | 9/2002 |

OTHER PUBLICATIONS

International Search Report and Written Opinion of the International Searching Authority for International Application No. PCT/US2009/048262, dated Oct. 22, 2009.

* cited by examiner

*Primary Examiner* — Nghi H Ly
(74) *Attorney, Agent, or Firm* — McDonnell Boehnen Hulbert & Berghoff LLP

(57) ABSTRACT

Methods and systems are provided for using base-station location to assist mobile-device system acquisition. A mobile station, which stores a network identifier, selects a carrier frequency. The mobile station receives, from a base station on a first carrier frequency, geographic coordinates of the base station and a base-station network identifier, and determines whether the base-station network identifier matches the mobile-station network identifier. If the base-station network identifier matches the mobile-station network identifier, the mobile station will scan the indicated home frequency bands and will connect to one of the home frequencies, and if the base-station network identifier does not match the mobile-station network identifier, the geographic coordinates of the base station are used to identify a market area and a most-preferred carrier frequency is selected from the identified market area.

20 Claims, 7 Drawing Sheets

| FIRST LATITUDE 216 | FIRST LONGITUDE 218 | SECOND LATITUDE 217 | SECOND LONGITUDE 219 | MARKET AREA 220 |
|---|---|---|---|---|
| LAT_1 | LONG_1 | LAT_4 | LONG_4 | MARKET_AREA_1 |
| LAT_2 | LONG_2 | LAT_5 | LONG_5 | MARKET_AREA_2 |
| LAT_3 | LONG_3 | LAT_6 | LONG_6 | MARKET_AREA_3 |

LOCATION TABLE 210

FIG. 3a

| MARKET AREA 220 | FREQUENCY IDENTIFIERS 222 |
|---|---|
| MARKET_AREA_1 | Provider_1 (A, B, C); Provider_2 (D, E, F) |
| MARKET_AREA_2 | Provider_1 (D, E, F); Provider_2 (A, B, C) |
| MARKET_AREA_3 | Provider_1 (D, E); Provider_2 (C) |

MSCP 212

FIG. 3b

| FREQUENCY IDENTIFIERS 222 | FREQUENCY 224 |
|---|---|
| A | F1 |
| B | F2 |
| C | F3 |
| D | F4 |
| E | F5 |

CHANNEL LIST TABLE 214

FIG. 3c

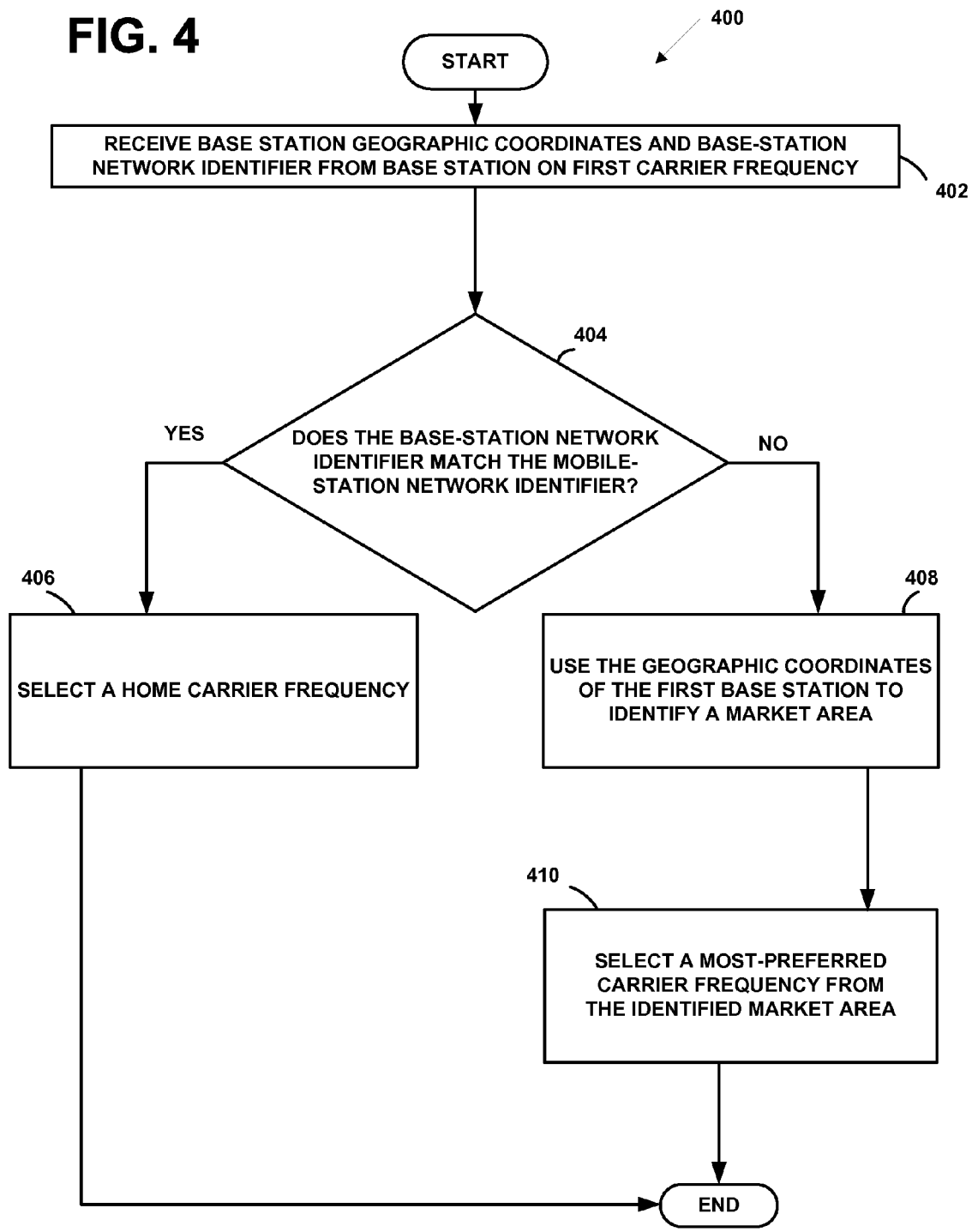

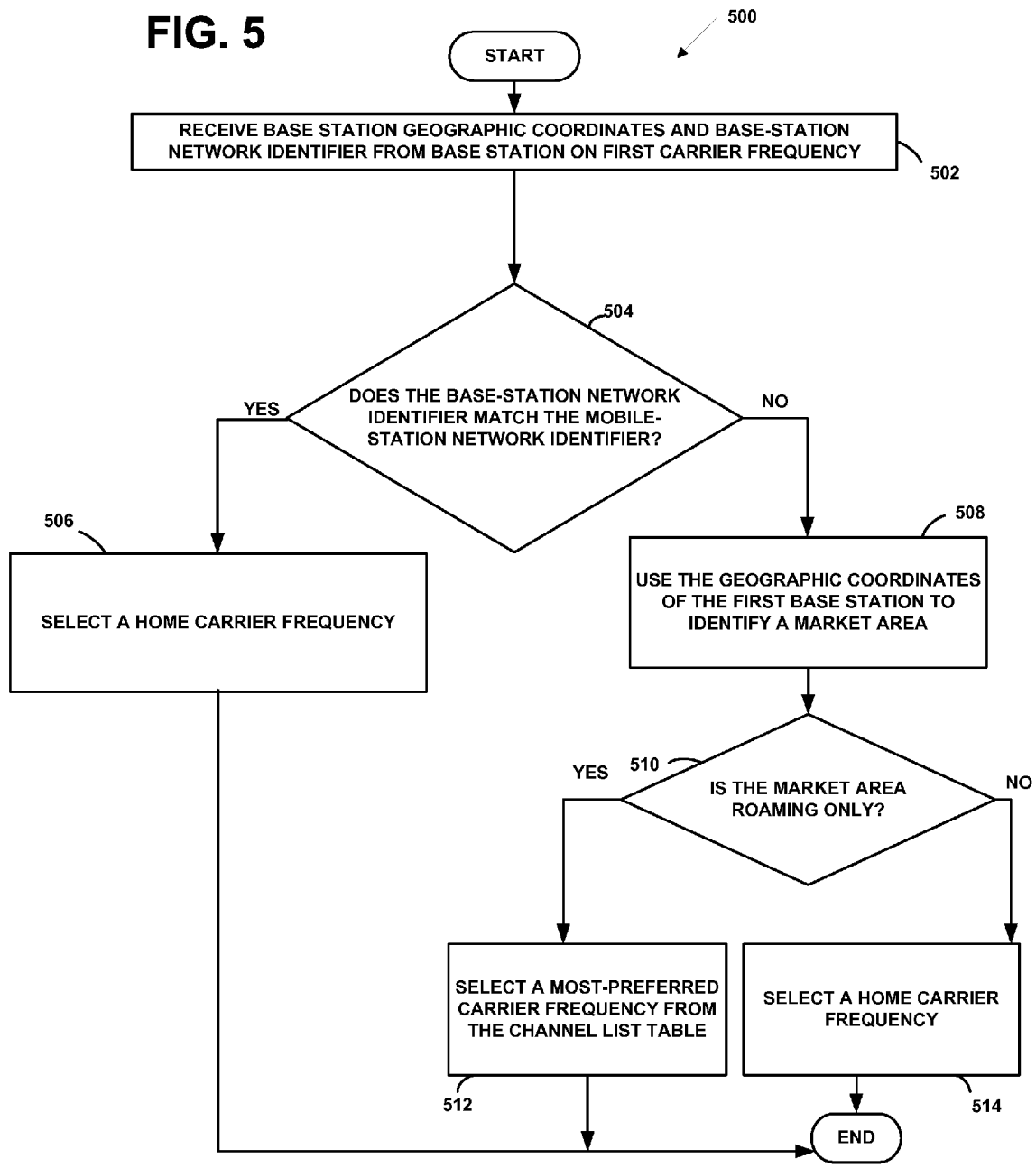

USING BASE-STATION LOCATION TO ASSIST MOBILE-DEVICE SYSTEM ACQUISITION

BACKGROUND

1. Technical Field

The present invention relates to wireless communications and, more particularly, to methods and systems for allocating wireless communication frequencies.

2. Description of Related Art

The widespread growth in popularity of wireless communications has given rise to a commensurate growth in the number of end-user devices that are equipped with wireless communication functionality. Once limited to cellular telephones and pagers, the industry has now expanded to provide wireless communication functionality in many other types of devices as well, including, for example, notebook computers, personal digital assistants (PDAs), cameras, media players, vending machines, automobiles, parking meters, factory equipment, and household appliances, among others.

Cellular wireless communication systems typically provide both voice and data communication using a wireless communication format, such as the traditional Code Division Multiple Access (CDMA), and typically cover relatively large geographic areas (cities, states, etc.), and are available to the service provider's customers generally.

The recent introduction of WiMAX technology promises to further increase the proliferation of wirelessly-equipped devices. WiMAX (Worldwide Interoperability for Microwave Access) is an Institute of Electrical and Electronics Engineers (IEEE) standard, designated 802.16, and provides a robust mechanism for wireless communication between base stations and subscriber stations. In particular, WiMAX is designed to provide fixed, portable or non-line-of-sight service with a potential range of 6 miles, a potential bandwidth on the order of 40 megabits per second, and superior quality of service and security. The bandwidth and range of WiMAX make it a suitable protocol for many applications, such as connecting wi-fi hotspots to each other, providing high-speed data and telecommunications services, and providing nomadic connectivity, to name a few.

SUMMARY

Disclosed herein are methods and a system for using base-station location to assist mobile-device system acquisition. In one aspect, the present invention may take the form of a method, in which a mobile station, which stores a network identifier, selects a carrier frequency. The method comprises receiving, from a base station on a first carrier frequency, geographic coordinates of the base station and a base-station network identifier, and determining whether the base-station network identifier matches the mobile-station network identifier. If the base-station network identifier matches the mobile-station network identifier, the mobile station selects a home carrier frequency, and if the base-station network identifier does not match the mobile-station network identifier, the geographic coordinates of the base station are used to identify a market area, and a most-preferred carrier frequency is selected from the identified market area.

In another aspect, the present invention may take the form of a mobile station comprising a wireless-communication interface, a processor, and data storage comprising a mobile-station network identifier and instructions executable by the processor for carrying out the above-described method.

These as well as other aspects and advantages will become apparent to those of ordinary skill in the art by reading the following detailed description, with reference where appropriate to the accompanying drawings.

BRIEF DESCRIPTION OF THE DRAWINGS

Various exemplary embodiments are described herein with reference to the following drawings, wherein like numerals denote like entities.

FIG. 3a is a simplified chart of an exemplary set of data that may be stored in a location table, in accordance with exemplary embodiments;

FIG. 3b is a simplified chart of an exemplary set of data that may be stored in a market specific channel plan (MSCP), in accordance with exemplary embodiments;

FIG. 3c is a simplified chart of an exemplary set of data that may be stored in a channel-list table, which may be used in accordance with exemplary embodiments;

FIG. 4 is a flowchart of an exemplary embodiment, in the form of a method carried out along the communication system of FIG. 1; and FIG. 5 is a flowchart of exemplary embodiment, in the form of a method carried out along the communication system of FIG. 1.

DETAILED DESCRIPTION OF EXEMPLARY EMBODIMENTS

1. Overview

Figure 1:
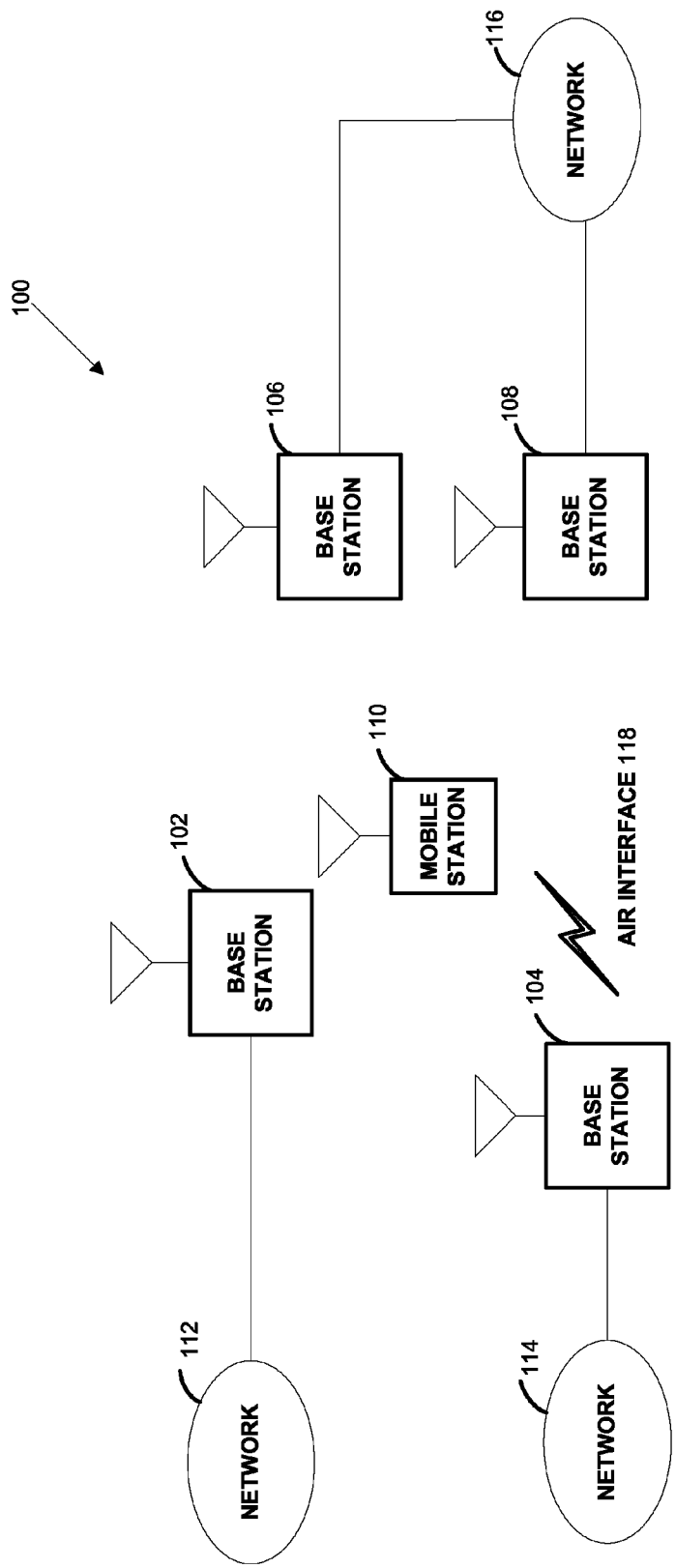
FIG. 1 is a simplified block diagram of an exemplary region, in accordance with exemplary embodiments.

As noted above, newer protocols, such as WiMAX, are able to provide a robust mechanism for wireless communication between base stations and mobile stations. However, unlike other protocols, which maintain coverage under the same frequency from region to region, service providers using these newer protocols may provide coverage under different frequencies in different areas. For example, frequencies A-H may be available when using a WiMAX protocol. One service provider might provide WiMAX coverage under frequencies A, B, and C in a first location, while another service provider might provide WiMAX coverage under those same frequencies in second location. This lack of universality of the frequencies carried by each service provider can lead to problems when a mobile station is trying to determine which frequency to use. Preferably, a mobile station will use a frequency provided by its home service provider (i.e. a home carrier frequency). A service provider is a home service provider when it is also a carrier of the wireless service for the mobile station.

In the situation in which embodiments of the present invention may be carried out, a base station broadcasts an overhead signal to mobile stations. A given mobile station then chooses a frequency on which to connect. More specifically, a WiMAX base station emits a Downlink MAP signal in its coverage area, on its operating frequency or frequencies. A Downlink MAP signal is an overhead control signal, which may include the network identifier of the base station, which may identify the service provider that operates the base station. The base station may also broadcast its geographic coordinates as part of the Downlink MAP signal. The WiMAX mobile station receives the information sent from the base station, and first compares the base-station network identifier to its own stored network identifier. If the network identifiers match, that is, if they are provided by the same service provider, then the mobile station will scan for the indicated home frequency bands provided by its home service provider, and the mobile station will select a home carrier frequency.

However, if the base-station network identifier and the mobile-station network identifier do not match, the mobile station may use the base station's geographic coordinates to determine which frequencies are provided in the area and which service providers provide them. The mobile station may include a location table, wherein various latitude and longitude coordinates are correlated with various market areas. Another table within the mobile station, referred to herein as a market-specific channel plan, may list identifiers (e.g. A, B, C, etc.) of frequencies provided for each market area. And yet another table, referred to herein as a channel list, may provide frequency value information (e.g. MHz) for each frequency identifier.

The market-specific channel plan may indicate by which service provider each frequency is provided. If the mobile station finds a frequency that is provided by a home service provider, the mobile station may connect to that frequency (or another home frequency). If there are no frequencies provided by a home service provider, the mobile station will scan the market-specific channel plan for whatever coverage is available (i.e. roaming coverage).

The mobile station may use the geographic coordinates received from the base station sequentially to look up information in these tables. Specifically, the mobile station may first use the location table (using the geographic coordinates of the base station as a key) to identify in which market area the first base station is located. Next, the mobile station may use the identified market area to look up, in the market-specific channel plan, identifiers (e.g. A, B, C) of frequencies correlated with that market area. Once the mobile station has the list of carrier frequency identifiers for that market area, the mobile station may use the channel list to determine frequency values for the frequency identifiers.

Other possibilities exist, without departing from the scope and spirit of the present invention. And it should be noted that the above overview is meant to be illustrative, not limiting. That is, additional and/or different features may be present in some embodiments of the present invention. It should be noted as well that the description of WiMAX is an example; the present invention may be applied to other contexts in which a device (e.g. a mobile station) communicates with base stations, and where the same frequencies are provided by different service providers in different geographical areas.

2. Exemplary Architecture a. Exemplary Communication System

FIG. 1 is a simplified block diagram of an exemplary region, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, region 100 includes a first base station 102, a second base station 104, a third base station 106, a fourth base station 108, a mobile station 110, a first network 112, a second network 114, a third network 116, and an air interface 118. The entities depicted in FIG. 1 are merely illustrative; for example, there could be any number of mobile stations, base stations, networks, and air interfaces.

Region 100 represents an area within which mobile station 110 is located. Region 100 may include a number of cells or cell sites, each of which may be defined by an RF radiation pattern from a respective base station. Cells within region 100 may overlap with neighboring cells and may vary widely in shape and size.

Mobile station 110 may be any mobile device capable of communicating with one or more base stations. Mobile station 110 may communicate with any of first base station 102, second base station 104, third base station 106, or fourth base station 108 over air interface 118 using a protocol such as WiMAX or CDMA (or another protocol). Mobile station 110 is described more fully in connection with FIGS. 2, 3a, 3b, and 3c, and may, in general, be any device capable of communicating with a base station, and of carrying out the functions described herein. As examples, mobile station 110 may be a cellular phone, PDA, or laptop computer.

Each of first base station 102, second base station 104, third base station 106, or fourth base station 108 may be any base station capable of communicating over air interface 118 with devices such as mobile station 110, using a wireless communication protocol such as WiMAX (or another protocol such as CDMA, GSM, etc.). WiMAX is based on the IEEE 802.16 standard, which may also be called WirelessMAN. The protocol may be fixed WiMAX, known as 802.16-2004 or 802.16d. Fixed WiMAX has no support for mobility. The protocol may be mobile WiMAX, known as 802.16e-2005, or 802.16e. Mobile WiMAX has support for mobility.

Mobile WiMAX is designed to operate multiple times faster than today's 3G wireless networks. With embedded WiMAX chipsets in laptops, phones, PDAs, mobile Internet devices and consumer electronic equipment, mobile WiMAX technology is expected to allow users to wirelessly access a range of multimedia applications, such as live videoconferencing, recorded video, games, large data files and more—anywhere in the network coverage area.

Any of first network 112, second network 114, or third network 116 may include one or more Wide Area Networks (WANs), one or more Local Area Networks (LANs), one or more public networks such as the Internet, one or more private networks, one or more wired networks, and/or one or more wireless networks.

b. Exemplary Mobile Station

Figure 2:
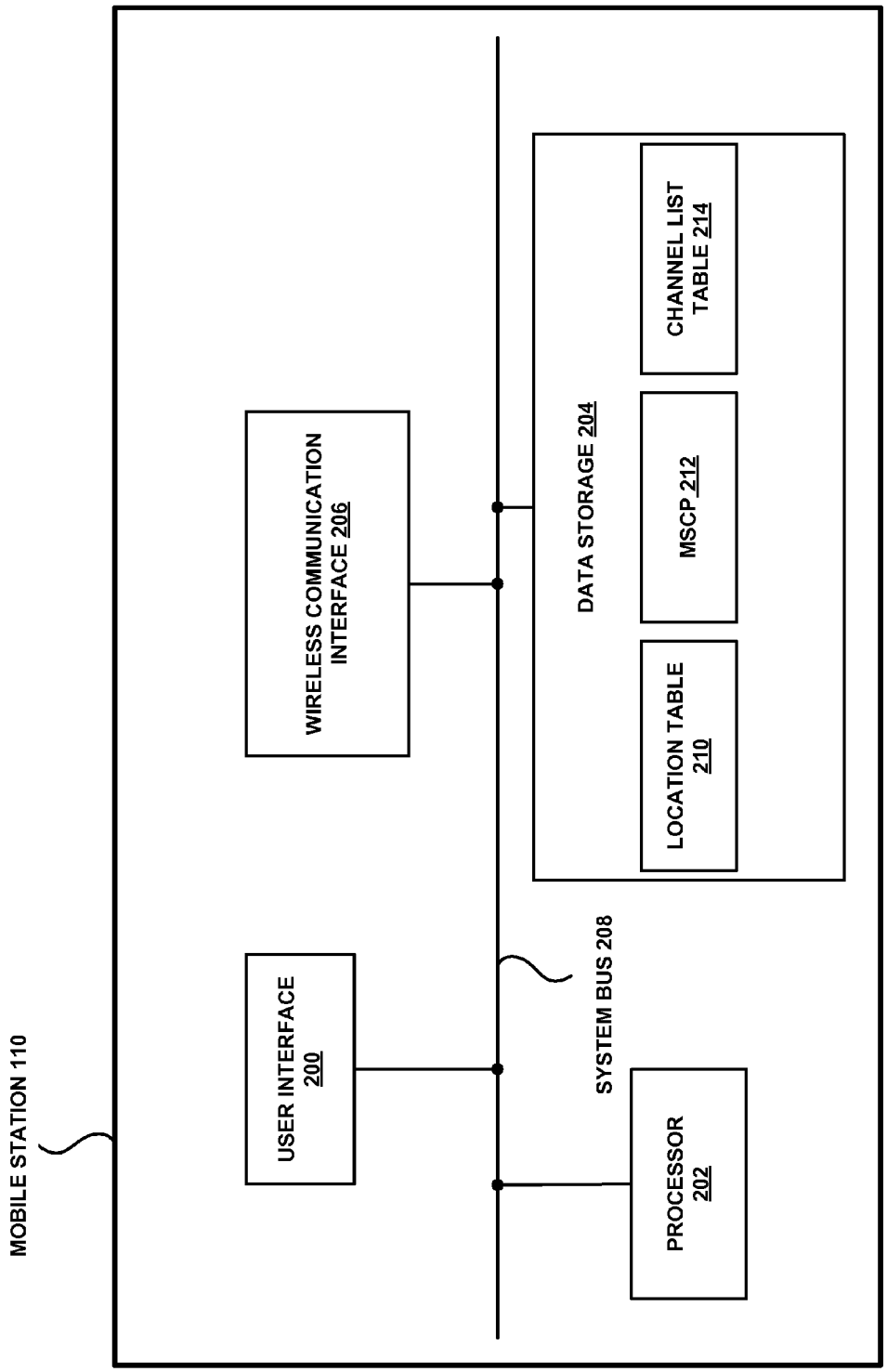
FIG. 2 is a simplified block diagram of an exemplary mobile station, which may be used in accordance with exemplary embodiments.

FIG. 2 is a simplified block diagram of an exemplary mobile station, which may be used in accordance with exemplary embodiments. In particular, FIG. 2 depicts mobile station 110 of FIG. 1. As shown in FIG. 2, mobile station 110 includes a user interface 200, a processor 202, a data storage 204, and a wireless communication interface 206, all of which may be communicatively linked by a system bus 208. In general, mobile station 110 may be any device arranged to communicate over air interfaces with base stations, and carry out the mobile-station functions described herein.

User interface 200 includes one or more mechanisms for receiving inputs from users, and one or more mechanisms for communicating outputs to users. Mobile-station user interfaces are known in the art, and thus are not described in detail here. Suffice it to say that user interface 200 may include buttons, a touchscreen, a microphone, and any other mechanisms now known or later developed for receiving inputs, as well as an LCD or other display, speakers, and any other mechanisms now known or later developed for communicating outputs.

Processor 202 may control many operations of mobile station 110 by executing a set of program instructions, and may comprise multiple (e.g., parallel) processors, such as a general purpose microprocessor and/or a discrete digital signal processor. Data storage 204 may store program instructions, device data, communication protocols, and device management logic. Data storage 204 may take various forms, in one or more parts, such as a non-volatile storage block and/or a removable storage medium.

Wireless communication interface 206 may serve as the interface between mobile station 110 and any base station. Wireless communication interface 206 functions to facilitate wireless communication according to one or more protocols such as those noted above. In an exemplary embodiment, wireless communication interface 206 supports WiMAX communication. An exemplary wireless communication interface is an MSM series chipset manufactured by Qualcomm Incorporated, together with one or more internal or external antennas.

Data storage 204 may store data used by processor 202 to operate mobile station 110. Data storage 204 comprises a location table 210, a market specific channel plan ("MSCP") 212, and a channel list 214.

FIG. 3a is a simplified block diagram of an exemplary set of data that may be stored in location table 210, in accordance with exemplary embodiments. As shown in FIG. 3a, location table 210 comprises first latitude entries 216, first longitude entries 218, second latitude entries 217, second longitude entries 219, and a market area 220 that corresponds to each area defined by each set of pairs of latitude and longitude entries. In each row, first latitude entries 216 and first longitude entries 218 represent a first location, while second latitude entries 217 and second longitude entries 219 represent a second location. The line connecting first and second locations may be a diagonal line of a virtual rectangle. It should be noted that location table 210 may include additional and/or different values, and may be arranged differently, without departing from the invention.

FIG. 3b is a simplified block diagram of an exemplary set of data that may be stored in a market-specific channel plan (MSCP) 212, in accordance with exemplary embodiments. As shown in FIG. 3b, MSCP 212 comprises a plurality of market areas and corresponding frequency identifiers. The frequency identifiers that are listed as corresponding to a particular market area represent the frequencies that are available in that market area. MSCP 212 may indicate which provider has which frequency. For example, as shown in FIG. 3b, in Market Area 1, Provider_1 has frequencies A, B, and C, whereas Provider_2 has frequencies D, E, and F. It should be noted that MSCP 212 may include additional and/or different market areas and/or frequency identifiers, and may be arranged differently, without departing from the invention. And MSCP 212 may also include any additional data that may be helpful in a given implementation.

FIG. 3c is a simplified block diagram of an exemplary channel list 214, in accordance with exemplary embodiments. In particular, FIG. 3 is a diagram of channel list 214 of FIG. 2. Channel list 214 comprises the names of each frequency, or frequency identifiers 222, and corresponding frequency-value information (e.g. MHz) 224 for each frequency identifier. It should be understood that any or all of these tables could take many other forms as well, and that the arrangement shown in FIGS. 3a-3c is provided by way of example.

3. Exemplary Operation a. A First Exemplary Method

FIG. 4 is a flowchart of an exemplary embodiment, in the form of a method carried out along the communication system of FIG. 1. As shown in FIG. 4, the method 400 begins at step 402, when mobile station 110 receives base-station geographic coordinates and a base-station network identifier from a base station on a first carrier frequency.

At step 404, mobile station 110 determines whether the base-station network identifier matches a mobile-station network identifier stored by the mobile station. If the base-station network identifier matches the mobile-station network identifier, the mobile station will scan the indicated home frequency bands and will connect to one of the home frequencies at step 406.

If the base-station network identifier does not match the mobile-station network identifier, at step 408 the mobile station uses the geographic coordinates of the first base station to identify a market area.

At step 410 the mobile station will select a most-preferred carrier frequency from the identified market area. To determine the most-preferred carrier frequency, the mobile station may take the steps explained in further detail in the following subsections. It should be noted that, although embodiments of the present invention are described as being carried out by mobile station 110 alone, it is also contemplated that mobile station 110 may carry out embodiments of the present invention in cooperation with one or more network entities.

Please note as well that, in the balance of this description of method 400, WiMAX is used as the air-interface protocol. This is a choice made for illustration and clarity of presentation, not for limitation. It is contemplated that any types of wireless networks using any air-interface protocols could be used to carry out embodiments of the present invention.

i. Receive Base Station Coordinates and Network Identifier

At step 402, mobile station 110 receives base-station geographic coordinates and a base-station network identifier from a base station on a first carrier frequency. This step may involve, for example, first base station 102 transmitting those items over air interface 118. The base-station geographic coordinates may include both the latitude and the longitude of, e.g., first base station 102. The base-station network identifier may identify the service provider and/or network associated with the base station.

ii. Determine Whether the Base-Station Network Identifier Matches the Mobile-Station Network Identifier At step 404, mobile station 110 determines whether the base-station network identifier matches its stored mobile-station network identifier. Each network identifier identifies a network that provides coverage. Mobile station 110 compares its stored network identifier to the received base-station network identifier.

iii. Connect to the Base Station on the First Carrier Frequency

At step 406, if the network identifier for the mobile station 110 matches the network identifier for the first base station 102, then the mobile station will scan for the home frequency bands provided by its home service provider, and the mobile station will select a home carrier frequency.

iv. If the Base-Station Network Identifier and the Mobile-Station Network Identifier do not Match, Identify a Market Area At step 408, if the base-station network identifier does not match the mobile-station network identifier, mobile station 110 uses the geographic coordinates of first base station 102 to identify a market area. The location table 210 includes corresponding market areas for various virtual rectangles represented by sets of geographic coordinates, allowing first base station 102 to locate a market area for a particular set of geographic coordinates. Specifically, in each row of location table 210, first latitude entries 216 and first longitude entries 218 represent a first point, and second latitude entries 217 and second longitude entries 220 represent second point. The first point and second point are end points of a diagonal of a virtual rectangle. Base station 102's geographic coordinates may lie within this virtual rectangle, and a corresponding market area can then be identified from location table 210.

v. Select a Most-Preferred Carrier Frequency from the Identified Market Area At step 410 mobile station 110 will select a most-preferred carrier frequency from the identified market area. After mobile station 110 has determined the market area for first base station 102, mobile station 110 uses MSCP 212 to select a frequency identifier within the determined market area. Mobile station 110 may select a most-preferred carrier frequency using the following method.

vi. Select a Carrier Frequency

For step 410, if the market area comprises carriers that are roaming only, the mobile station will select a most-preferred carrier frequency from the channel list 214.

However, if the market area does not comprise roaming only, meaning there are also some home carrier frequencies, the mobile station will select a home carrier frequency. For purposes of this disclosure, a home carrier frequency may be a carrier frequency that belongs to a service provider that has a partnership with the service provider of the mobile station, as well as a carrier frequency provided by the mobile station's own service provider. If more than one home carrier frequency is present for a market area, the mobile station may select any one of the available home carrier frequencies.

The mobile station 110 then connects to its home network or another network on the selected carrier frequency, depending on whether the selected carrier frequency is a home carrier frequency or a roaming carrier frequency.

b. A Second Exemplary Method

FIG. 5 is a flowchart of another exemplary embodiment, in the form of a method carried out along the communication system of FIG. 1. As shown in FIG. 5, the method 500 begins at step 502, when mobile station 110 receives base-station geographic coordinates and a base-station network identifier from a base station on a first carrier frequency.

At step 504, mobile station 110 determines whether the base-station network identifier matches a mobile-station network identifier stored by the mobile station. If the base-station network identifier matches the mobile-station network identifier, the mobile station will scan the indicated home frequency bands and will connect to one of the home frequencies at step 506.

If the base-station network identifier does not match the mobile-station network identifier, at step 508 the mobile station uses the geographic coordinates of the first base station to identify a market area.

If the market area comprises carriers that are roaming only, determined from step 510, at step 512 mobile station 110 will select a most-preferred carrier frequency from the identified market area. After mobile station 110 has determined the market area for first base station 102, mobile station 110 uses MSCP 212 to select a frequency identifier within the determined market area.

If the market area does not comprise roaming only, meaning there are also some home carrier frequencies, the mobile station will select a home carrier frequency at step 514. If more than one home carrier frequency is present for a market area, the mobile station may select any one of the available home carrier frequencies. Note that step 514 is accomplished using the MSCP and channel list in the manner described above.

The mobile station 110 then connects to its home network or another network on the selected carrier frequency.

4. Conclusion

Various exemplary embodiments have been described above. Those skilled in the art will understand, however, that changes and modifications may be made to those examples without departing from the scope of the claims.

The invention claimed is:

1. A method for a mobile station to select a carrier frequency, wherein the mobile station stores a mobile-station network identifier, the method comprising:
   receiving, from a base station on a first carrier frequency, geographic coordinates of the base station and a base-station network identifier;
   determining whether the base-station network identifier matches the mobile-station network identifier;
   if the base-station network identifier matches the mobile-station network identifier, selecting a home carrier frequency; and
   if the base-station network identifier does not match the mobile-station network identifier, using the geographic coordinates of the base station to identify a market area and selecting a most-preferred carrier frequency from the identified market area.

2. The method of claim 1, further comprising determining whether the identified market area comprises (a) at least one roaming carrier frequency and at least one home carrier frequency or (b) at least one roaming carrier frequency and no home carrier frequencies, wherein if the market area comprises at least one roaming carrier frequency and at least one home carrier frequency, the most-preferred carrier frequency is a home carrier frequency.

3. The method of claim 1, wherein the mobile station comprises a WiMAX mobile station, and wherein the base station comprises a WiMAX base station.

4. The method of claim 1, wherein the geographic coordinates of the base station comprise a latitude and a longitude.

5. The method of claim 1, wherein using the geographic coordinates of the base station to identify the market area comprises identifying the market area by using the geographic coordinates of the base station as a key into a location table that correlates geographic coordinates with corresponding market areas.

6. The method of claim 5, wherein selecting the most-preferred carrier frequency from the identified market area comprises identifying a carrier-frequency identifier of the most-preferred carrier frequency by using the identified market area as a key into a market-specific channel plan that correlates market areas with pluralities of carrier-frequency identifiers.

7. The method of claim 6, wherein each plurality of carrier-frequency identifiers is ordered from most preferred to least preferred.

8. The method of claim 6, wherein selecting the most-preferred carrier frequency from the identified market area further comprises identifying a frequency value of the most-preferred carrier frequency by using the carrier-frequency identifier of the most-preferred carrier frequency as a key into a channel list that correlates carrier-frequency identifiers with carrier-frequency values.

9. The method of claim 1, wherein WiMAX service is provided on the most-preferred carrier frequency.

10. A mobile-station comprising:
a wireless-communication interface;
a processor; and
data storage comprising a mobile-station network identifier and instructions executable by the processor for:
receiving, from a base station on a first carrier frequency, geographic coordinates of the base station and a base-station network identifier;
determining whether the base-station network identifier matches the mobile-station network identifier;
if the base-station network identifier matches the mobile-station network identifier, selecting a home carrier frequency; and
if the base-station network identifier does not match the mobile-station network identifier, using the geographic coordinates of the base station to identify a market area and selecting a most-preferred carrier frequency from the identified market area.

11. The mobile station of claim 10, further comprising determining whether the market area comprises (a) at least one roaming carrier frequency and at least one home carrier frequency or (b) at least one roaming carrier frequency and no home carrier frequencies, wherein if the market area comprises at least one roaming carrier frequency and at least one home carrier frequency, the most-preferred carrier frequency is a home carrier frequency.

12. The mobile station of claim 10, wherein the mobile station comprises a WiMAX mobile station, and wherein the base station comprises a WiMAX base station.

13. The mobile station of claim 10, wherein the geographic coordinates of the base station comprise a latitude and a longitude.

14. The mobile station of claim 10, wherein using the geographic coordinates of the base station to identify the market area comprises identifying the market area by using the geographic coordinates of the base station as a key into a location table that correlates geographic coordinates with corresponding market areas.

15. The mobile station of claim 14, wherein selecting the most-preferred carrier frequency from the identified market area comprises identifying a carrier-frequency identifier of the most-preferred carrier frequency by using the identified market area as a key into a market-specific channel plan that correlates market areas with pluralities of carrier-frequency identifiers.

16. The mobile station of claim 15, wherein each plurality of carrier-frequency identifiers is ordered from most preferred to least preferred.

17. The mobile station of claim 15, wherein selecting the most-preferred carrier frequency from the identified market area further comprises identifying a frequency value of the most-preferred carrier frequency by using the carrier-frequency identifier of the most-preferred carrier frequency as a key into a channel list that correlates carrier-frequency identifiers with carrier-frequency values.

18. The mobile station of claim 10, wherein the most-preferred carrier frequency is a frequency on which WiMAX service is provided.

19. A method for a mobile station to select a carrier frequency, wherein the mobile station stores a mobile-station network identifier, the method comprising:
receiving, from a base station on a first carrier frequency, geographic coordinates of the base station and a base-station network identifier;
determining whether the base-station network identifier matches the mobile-station network identifier;
if the base-station network identifier matches the mobile-station network identifier, selecting a home carrier frequency; and
if the base-station network identifier does not match the mobile-station network identifier:
correlating the geographic coordinates of the base station with a corresponding market area;
determining whether the corresponding market area comprises (a) at least one roaming carrier frequency and at least one home carrier frequency or (b) at least one roaming carrier frequency and no home carrier frequencies; and
selecting a most-preferred carrier frequency from the corresponding market area, wherein if the market area comprises at least one roaming carrier frequency and at least one home carrier frequency, the most-preferred carrier frequency is a home carrier frequency.

20. The method of claim 19, wherein the most-preferred carrier frequency is a frequency on which WiMAX service is provided.

* * * * *